US010044426B1

(12) United States Patent
Pawar et al.

(10) Patent No.: US 10,044,426 B1
(45) Date of Patent: Aug. 7, 2018

(54) TRANSMISSION MODE SELECTION BETWEEN BEAMFORMING AND MU-MIMO

(71) Applicant: Sprint Spectrum LP, Overland Park, KS (US)

(72) Inventors: Hemanth Pawar, Brambleton, VA (US); Chunmei Liu, Great Falls, VA (US); Krishna Sitaram, Chantilly, VA (US); Pratik Kothari, Herndon, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 159 days.

(21) Appl. No.: 15/166,510

(22) Filed: May 27, 2016

(51) Int. Cl.
*H04B 7/06* (2006.01)
*H04B 7/0452* (2017.01)
*H04W 72/04* (2009.01)
*H04L 5/00* (2006.01)
*H04W 72/08* (2009.01)
*H04L 29/06* (2006.01)
*H04W 88/08* (2009.01)
*H04W 88/02* (2009.01)

(52) U.S. Cl.
CPC ......... *H04B 7/0617* (2013.01); *H04B 7/0452* (2013.01); *H04L 5/005* (2013.01); *H04L 69/22* (2013.01); *H04W 72/042* (2013.01); *H04W 72/048* (2013.01); *H04W 72/082* (2013.01); *H04W 88/02* (2013.01); *H04W 88/08* (2013.01)

(58) Field of Classification Search
CPC ..... H04B 7/0617; H04B 7/0452; H04L 69/22; H04L 5/005; H04W 72/082; H04W 72/042; H04W 72/048; H04W 88/02; H04W 88/08
See application file for complete search history.

(56) References Cited

U.S. PATENT DOCUMENTS

| 8,761,086 | B2 | 6/2014 | Gorokhov et al. | |
|---|---|---|---|---|
| 9,781,654 | B2* | 10/2017 | Wang | H04W 40/22 |
| 2014/0126437 | A1* | 5/2014 | Patil | H04B 7/0486 370/310 |
| 2014/0273862 | A1* | 9/2014 | Maaref | H04J 11/0026 455/63.1 |
| 2014/0293944 | A1 | 10/2014 | Kim et al. | |
| 2015/0117322 | A1* | 4/2015 | McGrath | H04W 72/00 370/329 |
| 2017/0135085 | A1* | 5/2017 | Kaushik | H04W 72/046 |

* cited by examiner

*Primary Examiner* — Tejis Daya

(57) ABSTRACT

Transmission mode selection operations include determining that a first wireless device out of a plurality of wireless devices connected to an access node qualifies for a beamforming transmission mode, determining that a pair of wireless devices out of the plurality of wireless devices qualifies for a multi-user multiple-input multiple-output (MU-MIMO) transmission mode, prioritizing each of the first wireless device and the pair of wireless devices based on one or more of a content type, a device type, or a device capability, and selecting one downlink transmission mode from the beamforming transmission mode and the MU-MIMO transmission mode based on the prioritizing.

19 Claims, 6 Drawing Sheets

TRANSMISSION MODE SELECTION BETWEEN BEAMFORMING AND MU-MIMO

TECHNICAL BACKGROUND

As wireless networks evolve and grow, there are ongoing challenges in providing high-quality service to increasing numbers of wireless devices or user equipment (UE) in various coverage areas of a wireless network. For example, beamforming is a transmission mode that is used to provide better coverage to wireless devices in specific locations within a coverage area of a cell or access node. A beamforming downlink transmission mode uses multiple antennae to direct or "steer" signals from the antennae towards a particular wireless device located at, for instance, a cell edge. Multi-user multiple input multiple output (MU-MIMO) is another transmission mode whereby two wireless devices are paired based on their ability to share the same set of resource blocks, such that parallel streams are transmitted to and from both wireless devices. Both beamforming and MU-MIMO require the use of multiple antennae, with any performance gains being proportional to a number of antennae deployed by a specific cell or access node. Thus, simultaneously using both transmission modes reduces the relative gains for each transmission mode.

OVERVIEW

Exemplary embodiments described herein include systems, methods, and processing nodes for transmission mode selection based on one or more of a content type of the transmission, a wireless device type, or a wireless device capability. An exemplary method for transmission mode selection includes determining that a first wireless device out of a plurality of wireless devices connected to an access node qualifies for a beamforming transmission mode, determining that a pair of wireless devices out of the plurality of wireless devices qualifies for a multi-user multiple-input multiple-output (MU-MIMO) transmission mode, prioritizing each of the first wireless device and the pair of wireless devices based on one or more of a content type, a device type, or a device capability, and selecting one downlink transmission mode from the beamforming transmission mode and the MU-MIMO transmission mode based on the prioritizing.

An exemplary system for transmission mode selection includes a processor and a memory coupled to the processor. The memory stores computer-readable instructions that are executed by the processor to perform operations including determining a first priority for a first wireless device and a second priority for a pair of wireless devices upon a first wireless device qualifying for a beamforming transmission mode and a pair of wireless devices qualifying for a multi-user multiple-input multiple-output (MU-MIMO) transmission mode, wherein the first and second priorities are based on one or more of a content type, a device type, or a device capability. The operations further include selecting the beamforming transmission mode upon the first priority being higher than the second priority, and selecting the MU-MIMO transmission mode upon the second priority being higher than the first priority.

An exemplary processing node for transmission mode selection is configured to perform operations including determining that a first wireless device qualifies for a beamforming transmission mode and a pair of wireless devices qualifies for a multi-user multiple-input multiple-output (MU-MIMO) transmission mode, wherein the pair of wireless devices comprises a second wireless device and a third wireless device, determining a priority of one or more of a content type, a device type, or a device capability of each wireless device from among the first, second, and third wireless devices, and selecting one downlink transmission mode from the beamforming transmission mode and the MU-MIMO transmission mode based on the priority.

DETAILED DESCRIPTION

Figure 1:
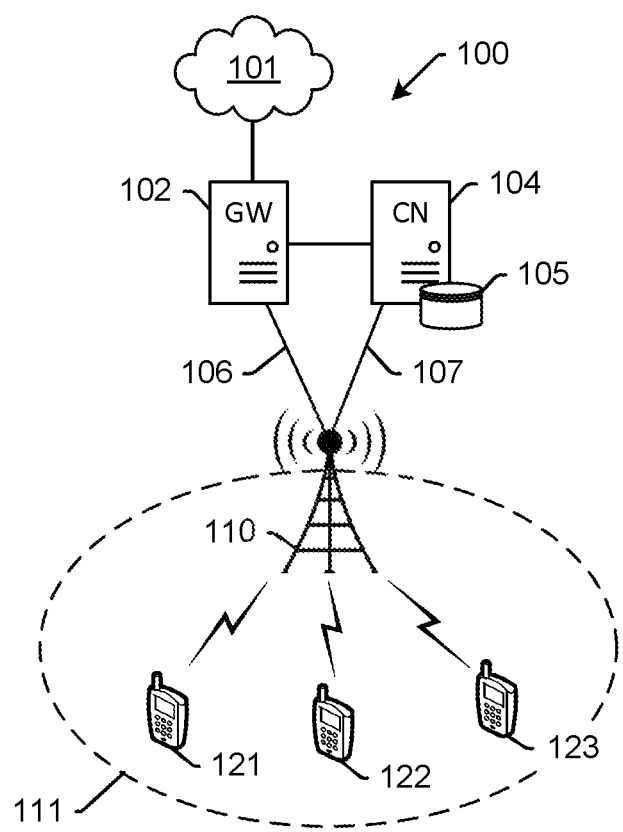
FIG. 1 depicts an exemplary system for transmission mode selection.

In embodiments disclosed herein, a transmission mode is selected based on certain properties of the end-user wireless device. For example, for a given access node comprising a plurality of antennae, one of a beamforming or MU-MIMO transmission mode is selected based on properties such as a content type scheduled for the transmission, a wireless device type, and/or a wireless device capability. The selection is triggered upon determining that there are at least two wireless devices connected to the access node that qualify for a MU-MIMO transmission mode (i.e. a pair of wireless devices), and that there is at least one wireless device that qualifies for a beamforming transmission mode. In other words, since an access node can optimally deploy either beamforming or MU-MIMO but not both, the selection between the two transmission modes is triggered when there is a conflict that needs to be resolved.

In exemplary embodiments described herein, the properties used to determine the transmission mode include a type of content being transmitted between the access node and each of the wireless devices, wherein each different content type may be assigned a predetermined priority. The priority of each content type may be based on numerous factors, including but not limited to a QoS of the transmission, a latency requirement, an application, requirement, a data rate requirement, an average throughput, etc. In one exemplary embodiment, the priorities of the content type for each of the pair of wireless devices qualifying for MU-MIMO and the one wireless device qualifying for beamforming are compared, and the higher-prioritized content type is used to determine the transmission mode. The content type may be determined using deep packet inspection, or a packet sniffer anywhere on the network that reports back to the network node performing the transmission mode selection. Content types and priorities for wireless devices connected to the access node (or sector deployed therefrom) are used to determine the transmission mode. If the priority of the content type for the beamforming wireless device (i.e. the wireless device that can benefit from the beamforming transmission mode) is higher than the priority of the content type for both of the wireless devices qualifying for MU-MIMO, then the beamforming transmission mode is selected. Conversely, if the priority of the content type for at least one of the pair of wireless devices is higher than the priority of the content type for the beamforming wireless device, then the MU-MIMO transmission mode is selected. Upon both content types having equal priority, the MU-MIMO transmission mode may be selected.

In another exemplary embodiment, the properties can comprise a type of the wireless device, including a make and/or a model of the wireless device. Moreover, each make/model may be assigned a predefined priority based on, for instance, a popularity or ubiquity of that make/model used by customers of the network. For example, certain models of wireless devices such as SAMSUNG™ GALAXY™ devices or APPLE™ IPHONE™ devices may be preferred over other types of devices Such devices can be referred to as "preferred" wireless devices and can further be prioritized higher than other non-preferred or "standard" wireless devices. Similar to the content type selection described above, if the priority of the device type for the beamforming wireless device is higher than the priority of the device type for both of the wireless devices qualifying for MU-MIMO, then the beamforming transmission mode is selected. Conversely, if the priority of the device type for at least one of the pair of wireless devices is higher than the priority of the device type for the beamforming wireless device, then the MU-MIMO transmission mode is selected. Upon all device types having equal priority, the MU-MIMO transmission mode may be selected.

In another exemplary embodiment, the device type may be used to further infer a wireless capability of the wireless device, and the wireless devices prioritized based on the wireless capability. Wireless capability may include, for instance, a number of band classes that the wireless device is capable of accessing (using, for instance, multiple transceivers), and/or a number of carriers the wireless device is capable of utilizing for carrier aggregation. For example, a first wireless device that is able to access fewer band classes or aggregate fewer carriers may have a greater need for a beamforming transmission mode (or MU-MIMO transmission mode if the first wireless device is part of a pair), versus a second wireless device that can access or aggregate a greater number of bands. Thus, a wireless device (or pair of devices) with fewer capabilities can be prioritized higher than wireless devices that can access or aggregate more bands. Moreover it should be understood that the number of available carriers/bands is only one factor that can be considered in prioritizing devices. Priorities may be customized for different types of carrier aggregation and band class capabilities. For instance, if the beamforming wireless device can access a specific set of band classes that is different than the band classes accessible by one or both of the pair of wireless devices, then the beamforming transmission mode is selected. Conversely, if at least one of the pair of wireless devices can access the specific set of band classes that is different than the beamforming device capability, then the MU-MIMO transmission mode is selected.

Several combinations of each of the aforementioned properties may be utilized in determining priorities of wireless devices. Further, the operations disclosed herein may be performed alongside or by a scheduling module of a network node such as a controller node or access node, and may be repeated at time intervals such as a transmission time interval (TTI), or a preconfigured time period. These and additional operations are further described with respect to the embodiments depicted in FIGS. 1-6 below.

FIG. 1 depicts an exemplary system 100 for transmission mode selection. System 100 comprises a communication network 101, gateway 102, controller node 104, access node 110, and end-user wireless devices 121, 122, and 123. Access node 110 is illustrated as having coverage area 111, with end-user wireless devices 121, 122, 123 being located within coverage area 111 and accessing network services directly from access node 110 via an air interface deployed by access node 110. In operation, one or more of access node 110, controller node 104, or another network node, in any combination, can be configured to select a transmission mode based on certain properties of wireless devices 121, 122, 123. For example, access node 110 may comprise a number of antennae that can provide gains when used in only one of a beamforming or MU-MIMO transmission mode. Thus, the transmission mode may be selected based on prioritizing devices 121, 122, 123 based on one or more of a content type scheduled for the transmission, a wireless device type, and/or a wireless device capability. The selection is triggered upon determining that there are at least two wireless devices from wireless devices 121, 122, 123 that qualify for a MU-MIMO transmission mode (i.e. a pair of wireless devices), and that there is at least one wireless device from wireless devices 121, 122, 123 that qualifies for a beamforming transmission mode.

Access node 110 can be any network node configured to provide communication between end-user wireless devices 121, 122, 123 and communication network 101, including standard access nodes and/or short range, low power, small access nodes. For instance, access node 110 may include any standard access node, such as a macrocell access node, base transceiver station, a radio base station, an eNodeB device, an enhanced eNodeB device, or the like. In an exemplary embodiment, a macrocell access node can have a coverage area 111 in the range of approximately five kilometers to thirty five kilometers and an output power in the tens of watts. In other embodiments, access node 110 can be a small access node including a microcell access node, a picocell access node, a femtocell access node, or the like such as a home NodeB or a home eNodeB device. Moreover, it is noted that while access node 110 is illustrated in FIG. 1, any number of access nodes and relay nodes can be implemented within system 100.

Access node 110 can comprise a processor and associated circuitry to execute or direct the execution of computer-readable instructions to perform operations such as those further described herein. Briefly, access node 110 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Further, access node 110 can receive instructions and other input at a user interface. Access node 110 communicates with gateway node 102 and controller node 104 via communication links 106, 107. Access node 110 may communicate with other access nodes (not shown) using a direct link such as an X2 link or similar.

Wireless devices 121, 122, 123 may be any device, system, combination of devices, or other such communication platform capable of communicating wirelessly with access node 110 using one or more frequency bands deployed therefrom. Wireless devices 121, 122, 123 may be, for example, a mobile phone, a wireless phone, a wireless modem, a personal digital assistant (PDA), a voice over internet protocol (VoIP) phone, a voice over packet (VOP) phone, or a soft phone, as well as other types of devices or systems that can exchange audio or data via access node 110. Other types of communication platforms are possible. In some exemplary embodiments, wireless devices 121, 122, 122 may be function as relay nodes for relaying transmissions between a donor access node, such as access node 110, to other end-user wireless devices. Relay nodes are useful for relaying transmissions to edges of a coverage area of a donor access node to improve coverage and/or service, as well as in crowded areas having a high number of other wireless devices to increase the available throughput to the end-user wireless devices being relayed. Thus, beamforming and other multi-antenna transmission modes implemented for relay nodes can improve a quality of service for said end-user wireless devices. They relay node may be a fixed or moving relay node. For example, one of wireless devices 121, 122, 122 serving as a moving relay node can be physically coupled to a mode of transportation, such as a motor vehicle. The relay node is connected via a backhaul connection to one of a plurality of donor access nodes such as access node 110, depending on the current location of the mode of transportation. Thus, the relay node relays services from a donor access node to an end-user wireless device within the motor vehicle.

Communication network 101 can be a wired and/or wireless communication network, and can comprise processing nodes, routers, gateways, and physical and/or wireless data links for carrying data among various network elements, including combinations thereof, and can include a local area network a wide area network, and an internetwork (including the Internet). Communication network 101 can be capable of carrying data, for example, to support voice, push-to-talk, broadcast video, and data communications by wireless devices 121, 122, 123, etc. Wireless network protocols can comprise MBMS, code division multiple access (CDMA) 1×RTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), and Worldwide Interoperability for Microwave Access (Wi-MAX). Wired network protocols that may be utilized by communication network 101 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 101 can also comprise additional base stations, controller nodes, telephony switches, internet routers, network gateways, computer systems, communication links, or some other type of communication equipment, and combinations thereof.

Communication links 106, 107 can use various communication media, such as air, space, metal, optical fiber, or some other signal propagation path—including combinations thereof. Communication links 106, 107 can be wired or wireless and use various communication protocols such as Internet, Internet protocol (IP), local-area network (LAN), optical networking, hybrid fiber coax (HFC), telephony, T1, or some other communication format—including combinations, improvements, or variations thereof. Wireless communication links can be a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof. Communications links 106, 107 may include S1 communications links. Other wireless protocols can also be used. Communication links 106, 107 can be a direct link or might include various equipment, intermediate components, systems, and networks. Communication links 106, 107 may comprise many different signals sharing the same link Gateway node 102 can be any network node configured to interface with other network nodes using various protocols. Gateway node 102 can communicate user data over system 100. Gateway node 102 can be a standalone computing device, computing system, or network component, and can be accessible, for example, by a wired or wireless connection, or through an indirect connection such as through a computer network or communication network. For example, gateway node 102 can include a serving gateway (SGW) and/or a public data network gateway (PGW), etc. One of ordinary skill in the art would recognize that gateway node 102 is not limited to any specific technology architecture, such as Long Term Evolution (LTE) and can be used with any network architecture and/or protocol.

Gateway node 102 can comprise a processor and associated circuitry to execute or direct the execution of computer-readable instructions to obtain information. Gateway node 102 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Gateway node 102 can receive instructions and other input at a user interface.

Controller node 104 can be any network node configured to communicate information and/or control information over system 100. Controller node 104 can be configured to transmit control information associated with a handover procedure. Controller node 104 can be a standalone computing device, computing system, or network component, and can be accessible, for example, by a wired or wireless connection, or through an indirect connection such as through a computer network or communication network. For example, controller node 104 can include a mobility management entity (MME), a Home Subscriber Server (HSS), a Policy Control and Charging Rules Function (PCRF), an authentication, authorization, and accounting (AAA) node, a rights management server (RMS), a subscriber provisioning server (SPS), a policy server, etc. One of ordinary skill in the art would recognize that controller node 104 is not limited to any specific technology architecture, such as Long Term Evolution (LTE) and can be used with any network architecture and/or protocol.

Controller node 104 can comprise a processor and associated circuitry to execute or direct the execution of computer-readable instructions to obtain information. Controller node 104 can retrieve and execute software from storage, which can include a disk drive, a flash drive, memory circuitry, or some other memory device, and which can be local or remotely accessible. In an exemplary embodiment, controller node 104 includes a database 105 for storing properties such as content types, wireless device types and other information about end-user wireless devices 121, 122, 123, etc., as well as priorities associated therewith. This information may be requested by or shared with access node 110 via connections 106, 107, X2 connections, and so on. The software comprises computer programs, firmware, or some other form of machine-readable instructions, and may include an operating system, utilities, drivers, network interfaces, applications, or some other type of software, and combinations thereof. Controller node 107 can receive instructions and other input at a user interface.

Other network elements may be present in system 100 to facilitate communication but are omitted for clarity, such as base stations, base station controllers, mobile switching centers, dispatch application processors, and location registers such as a home location register or visitor location register. Furthermore, other network elements that are omitted for clarity may be present to facilitate communication, such as additional processing nodes, routers, gateways, and physical and/or wireless data links for carrying data among the various network elements, e.g. between access node 110 and communication network 101

Figure 2:
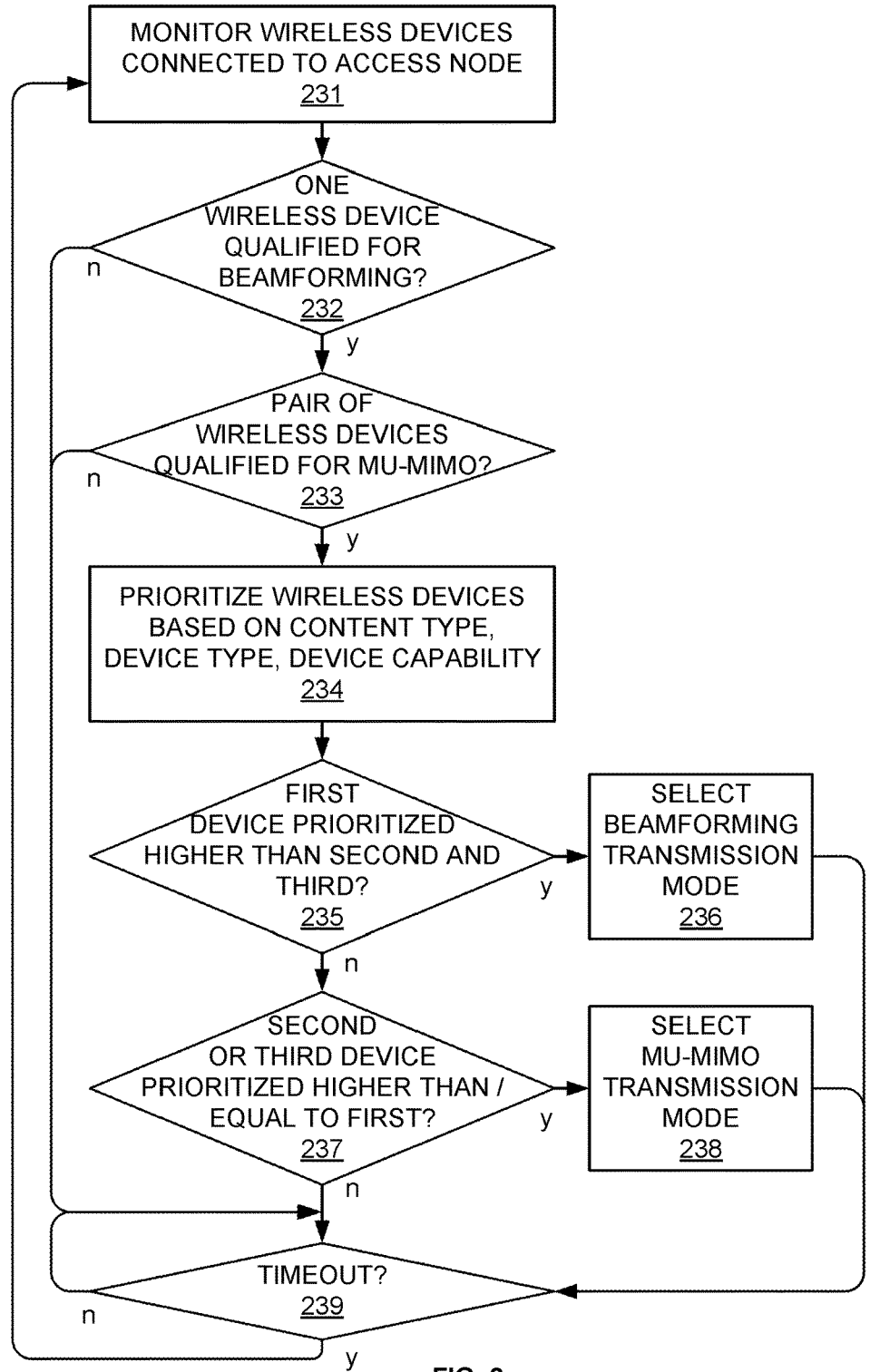
FIG. 2 depicts an exemplary method for transmission mode selection.

FIG. 2 depicts an exemplary method for transmission mode selection. The method of FIG. 2 is illustrated with respect to any network node such as a currently-serving access node, or a controller node. In other embodiments, the method can be implemented with any suitable network element. Although FIG. 2 depicts steps performed in a particular order for purposes of illustration and discussion, the operations discussed herein are not limited to any particular order or arrangement. One skilled in the art, using the disclosures provided herein, will appreciate that various steps of the methods can be omitted, rearranged, combined, and/or adapted in various ways.

Operations 231-233 involve monitoring wireless devices currently attached to a serving access node to determine whether or not to trigger transmission mode selection. At 231, the wireless devices are monitored to perform decisions 232 and 233. At 232, at least one wireless device may qualify for a beamforming transmission mode, and at 233, at least two wireless devices (i.e. a pair of device) may qualify for a MU-MIMO transmission mode. For example, determining that a first wireless device qualifies for the beamforming transmission mode can be based on a sounding reference signal transmitted from the first wireless device. One or more of an angle of arrival and a distance may be determined based on the sounding reference signal, and a location of the first wireless device may be determined. If the first wireless device is in a specific location or range of locations, such as at a cell edge of a coverage area of an access node, then it may qualify for beamforming. Further, determining that the pair of wireless devices qualifies for the MU-MIMO transmission mode can be based on a channel orthogonality and/or a SINR of each of the second and third wireless devices. At least a threshold channel orthogonality and SINR is recommended for optimal MU-MIMO transmission, and pairs of devices meeting the thresholds are qualified for MU-MIMO transmission. See FIGS. 4 and 5 for detailed methods regarding qualifying devices for different transmission modes.

In some embodiments, the at least one wireless device may be part of the pair of wireless devices, in which case any subsequent prioritization steps are determined between the properties of the two devices. In either case, if both decisions 232 and 233 result in an affirmative outcome, subsequent steps 234-238 for selecting between the two transmission modes are performed. If any one of decisions 232 and 233 result in a negative outcome, then there is no conflict needing to be resolved, and the method awaits expiration of a timer at 239 before repeating. Although not shown here, it will be appreciated by those having ordinary skill in the art that, upon no conflict being determined, an appropriate transmission mode can be selected without going through steps 234-238. Moreover, it will be appreciated that decisions 232 and 233 may be performed in any order in addition to the order depicted in FIG. 2, with no material change in the inventive concepts described herein.

At 234, the wireless devices determined to be qualified for beamforming in operation 232 and for MU-MIMO in operation 233 are prioritized based on one or more of a content type, a device type, and a device capability. For example, each different content type may be assigned a predetermined priority based on numerous factors, including but not limited to a QoS of the transmission, a latency requirement, an application, requirement, a data rate requirement, an average throughput, etc. The content type may be determined using deep packet inspection, or a packet sniffer anywhere on the network that reports back to the network node performing the transmission mode selection. Further, a device type of each wireless device may comprise one of a "preferred" type or a "standard" type, as well as other types defined by a network operator. The types generally relate to a popularity or ubiquity of devices of a particular make or model that are used by customers of the network, with certain preferred models of wireless devices being assigned a higher priority than non-preferred or "standard" wireless devices. In further exemplary embodiments, the device type may be used to infer a wireless capability of the wireless device that includes, for instance, a number of band classes that the wireless device is capable of accessing, and/or a number of carriers the wireless device is capable of utilizing for carrier aggregation.

Further at 234, the priorities of one or more properties (such as content type, device type, device capability) of each wireless device are compared, and the wireless device with the highest priority is used to determine the transmission mode. For example, if the priority of the content type for the beamforming wireless device (i.e. the wireless device that can benefit from the beamforming transmission mode) is higher than the priority of the content type for both of the wireless devices qualifying for MU-MIMO, then the beamforming transmission mode is selected. Conversely, if the priority of the content type for at least one of the pair of wireless devices is higher than the priority of the content type for the beamforming wireless device, then the MU-MIMO transmission mode is selected. Upon both content types having equal priority, the MU-MIMO transmission mode may be selected. Similarly, if the priority of the device type for the beamforming wireless device is higher than the priority of the device type for both of the wireless devices qualifying for MU-MIMO, then the beamforming transmission mode is selected. Moreover, a wireless device (or pair of devices) with fewer capabilities can be prioritized higher than wireless devices that can access or aggregate different numbers or sets of bands and carriers, such that devices with limited capabilities can benefit from the multi-antenna transmission modes (i.e. MU-MIMO and beamforming).

Tables 1, 2, and 3 below depict transmission mode selections for exemplary content types, device types, and device capabilities. Table 1 depicts video streaming and online gaming being prioritized higher than web browsing and email.

TABLE 1

| Wireless Device 1 (MU-MIMO) | Wireless Device 2 (MU-MIMO) | Wireless Device 3 (BF) | Transmission Mode |
|---|---|---|---|
| Web Browsing | Web Browsing | Video Streaming | BF |
| E-Mail | E-Mail | Video Streaming | BF |
| Web Browsing | Web Browsing | Online gaming | BF |
| E-Mail | E-Mail | Online gaming | BF |

TABLE 1-continued

| Wireless Device 1 (MU-MIMO) | Wireless Device 2 (MU-MIMO) | Wireless Device 3 (BF) | Transmission Mode |
|---|---|---|---|
| Web Browsing | E-Mail | Video Streaming | BF |
| E-Mail | Web Browsing | Online gaming | BF |
| Video Streaming | Video Streaming | Web Browsing | MU-MIMO |
| Online gaming | Online gaming | E-Mail | MU-MIMO |
| Video Streaming | E-Mail | Web Browsing | MU-MIMO |
| Web Browsing | Online gaming | E-Mail | MU-MIMO |
| Video Streaming | Web Browsing | Video Streaming | BF or MU-MIMO |

Table 2 below shows transmission mode selections for exemplary device types, with IPHONE™ and SG6™ devices being prioritized higher than HTC™, KYOCERA™, and LG™ devices.

TABLE 2

| Wireless Device 1 (MU-MIMO) | Wireless Device 2 (MU-MIMO) | Wireless Device 3 (BF) | Transmission Mode |
|---|---|---|---|
| iPhone | SG6 | HTC | MU-MIMO |
| iPhone | iPhone | Kyocera | MU-MIMO |
| SG5 | SG6 | LG | MU-MIMO |
| HTC | LG | iPhone | BF |
| LG | Kyocera | SG6 | BF |
| SG6 | LG | Kyocera | MU-MIMO |

Table 3 below shows transmission mode selections for exemplary device capabilities, with devices capable of accessing fewer bands and limited carrier aggregation (CA) being prioritized higher than tri-band and multiple CA devices, as the devices with limited capabilities have a greater need for multi-antenna transmission modes than other devices that can benefit from accessing other frequency bands or carriers.

TABLE 3

| Wireless Device 1 (MU-MIMO) | Wireless Device 2 (MU-MIMO) | Wireless Device 3 (BF) | Transmission Mode |
|---|---|---|---|
| Dual Band | Dual Band | Tri Band | MU-MIMO |
| Tri Band | Tri Band | Dual Band | BF |
| No CA | No CA | 2 CA | MU-MIMO |
| 2 CA | 2 CA | No CA | BF |
| 2 CA | 2 CA | 3 CA | MU-MIMO |

It should be noted that the transmission mode selections depicted in tables 1-3 are merely exemplary, and the priority of each property may be custom-defined by a network operator. For example, the lowest QoS content, or an unpopular type of devices (or pair of devices), may be prioritized higher for MU-MIMO, since forcing the devices to share resources (via MU-MIMO) may degrade the user experience. In another example, in the first row of Table 1, a network operator prefer to implement MU-MIMO to force low-prioritized content of wireless devices 1 and 2 to share resources, thereby leaving more resources (such as resource blocks) available for higher-prioritized content wireless device 3 to receive or transmit a video stream. Other factors used to prioritize types and capabilities of content and devices will be appreciated by those having ordinary skill in the art in light of this disclosure. Further, several combinations of each of the aforementioned properties may be utilized in determining priorities of wireless devices. For example, priorities of each property may be determined, and an aggregate priority determined for each wireless device. The aggregate priority may weigh each property the same or differently, depending upon the preferences of the network operator.

Further, it will be appreciated that a priority of the pair of wireless devices may be based on individual priorities for each wireless device in the pair, and setting the priority of the pair as equal to the higher of the device priorities. Moreover, it will be appreciated that in some cases, the beamforming (i.e. first) wireless device is a part of the pair of wireless devices. For example, a first wireless device can qualify for both a beamforming transmission mode, and a MU-MIMO transmission mode when paired with a second wireless device. Consequently, the priorities of the first and second wireless devices are compared (based, for instance, on priorities of one or more properties described herein), and the wireless device with the highest priority is used to determine the transmission mode.

Operations 235-238 select the transmission mode based on the results of prioritization in 234. For example, if the first (i.e. beamforming) device is prioritized higher than the second and third device at 235, then the beamforming transmission mode is selected at 236, and the method moves to the timer 239. If the first device is not prioritized higher than the second and third devices, then at 237 it is determined that the priorities of the devices are either equal, or one or both of the pair of devices is prioritized higher than the beamforming device, and the MU-MIMO transmission mode is selected at 238. In other words, the MU-MIMO transmission mode may be considered the default transmission mode, at least because among three devices having the same priority, fulfilling the requirements of two devices (i.e. the MU-MIMO pair) would yield greater efficiencies in the network. It will be appreciated that either of operations 235 and 237 can be re-ordered, or combined into a single comparison operation. Eventually, at 239, a transmission time interval (TTI) or any other preconfigured time period is monitored to determine when to repeat the operations starting back at monitoring operation 231.

Figure 3A:
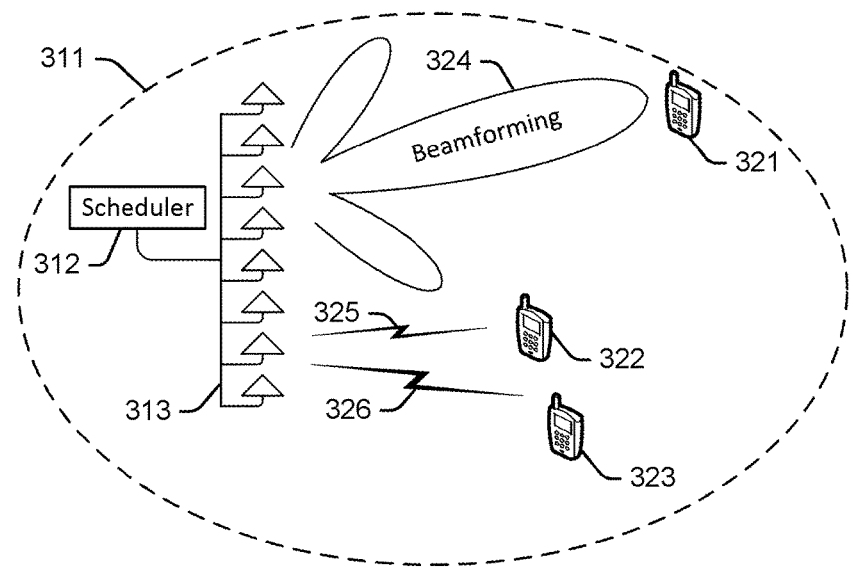
FIG. 3A-3B respectively depict exemplary selections of beamforming and MU-MIMO transmission modes.
Figure 3B:
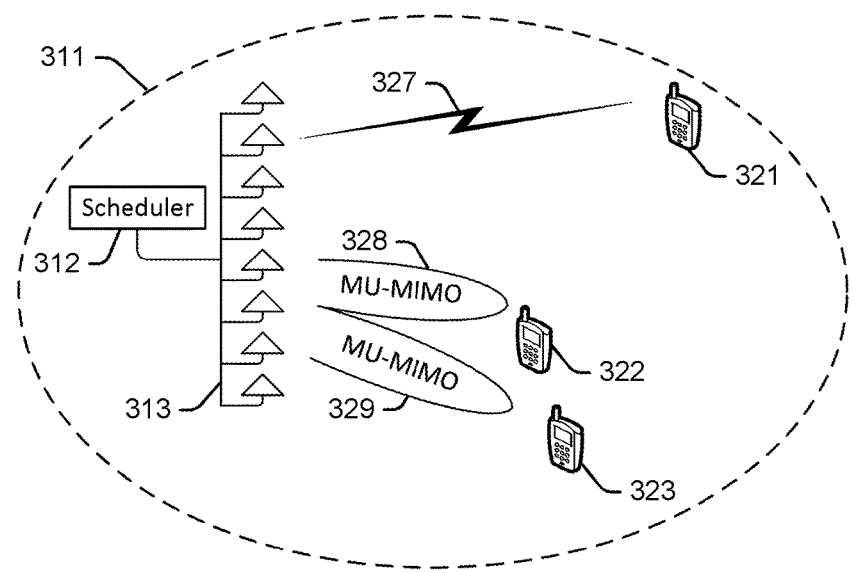

FIG. 3A-3B respectively depict exemplary selections of beamforming and MU-MIMO transmission modes. Both FIGS. 3A and 3B depict a scheduler 312 coupled to an antenna array 313 that has an effective coverage area of 311. Scheduler 312 and antenna array 313 may be part of an access node (not shown) similar to access node 110 in FIG. 1. Moreover, other components for enabling antenna array 313 to send and receive signals to and from wireless devices 321, 322, 323 within coverage area 311 are not shown for clarity. In either case, with reference to FIG. 3A, a selection of a beamforming transmission mode results in a first wireless device 321 receiving a beamformed signal 324, and second and third wireless devices 322, 323 receiving normal transmissions 325 and 326 from antenna array 313, respectively. In other words, since antenna array 313 can only effectively perform one transmission mode from among beamforming and MU-MIMO, the beamforming transmission mode 324 is selected. Beamforming transmission mode 324 may be selected based on a priority of first wireless device 321 being higher than a priority of either/both of wireless devices 322, 323.

Referring to FIG. 3B, a selection of a MU-MIMO transmission mode results in first wireless device 321 receiving a normal signal 327, and second and third wireless devices 322, 323 receiving MU-MIMO transmissions 328 and 329 from antenna array 313, respectively. Since antenna array 313 can only effectively perform one transmission mode from among beamforming and MU-MIMO, the MU-MIMO signals 328, 329 are transmitted to wireless devices 322, 323, based on a priority of at least one of wireless devices 322, 323 being higher than a priority of wireless device 321.

Figure 4:
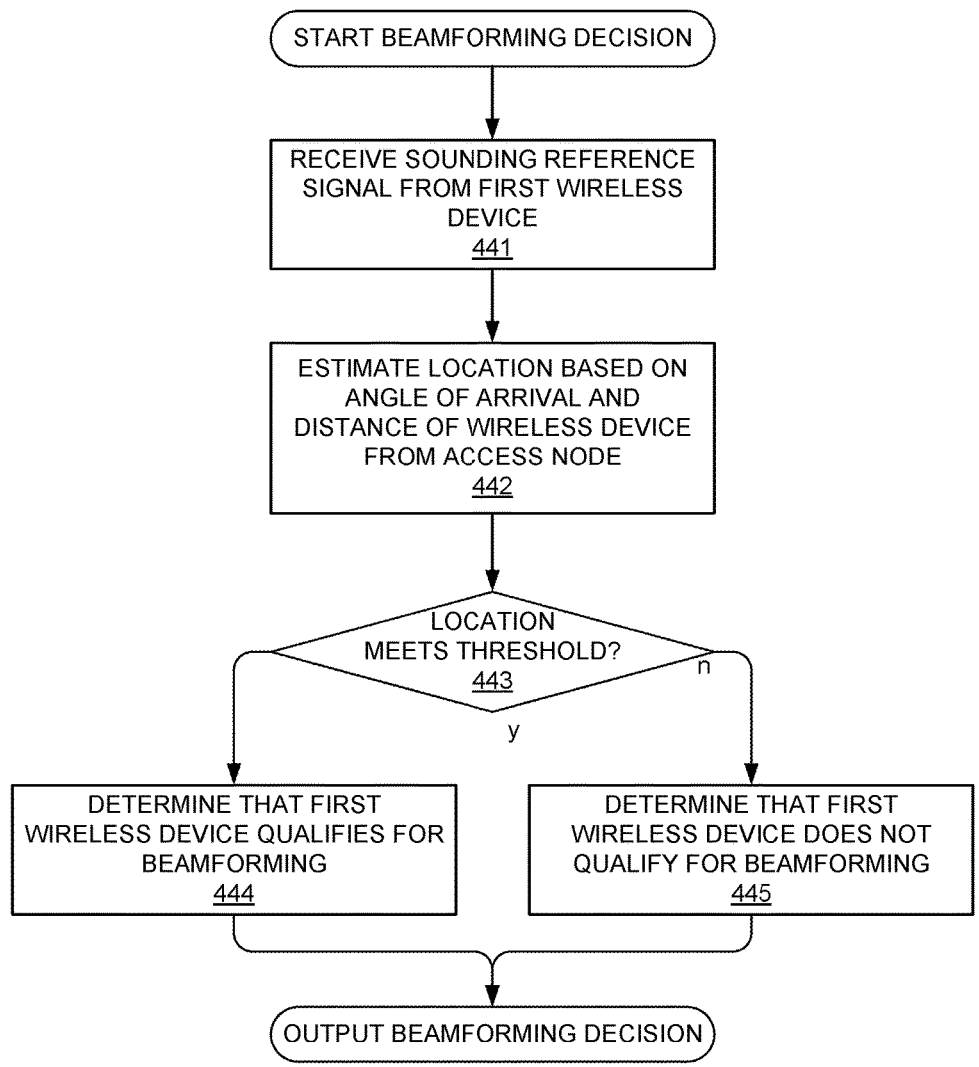
FIG. 4 depicts an exemplary method for determining whether a wireless device qualifies for beamforming.

FIG. 4 depicts an exemplary method for determining whether a wireless device qualifies for beamforming. As described herein, beamforming uses multiple antennas within an array to contribute to a steered signal having an array gain, thereby providing better coverage to specific areas along the edges of cells. To determine whether or not a wireless device qualifies for beamforming, a signal from the wireless device is monitored. For example, at 441, a sounding reference signal (SRS) is received at an access node. The access node (or a scheduler coupled thereto) may have allocated a resource block for the SRS to determine whether or not the wireless device qualifies for beamforming. The SRS is receive at multiple antennae of the access node, upon which the access node processes the received SRS at 442 to estimate location of the wireless device transmitting the SRS. The location may be estimated based on a direction or angle of arrival as well as a distance of the wireless device from the access node. The angle of arrival may be determined using, for instance, multiple signal classification (MUSIC) and estimation of signal parameter via rotational invariance technique (ESPRIT) operations. The distance between the access node and the wireless device may be estimated using, for instance, the timing of the received SRS.

Based on the angle and the distance, the location of the wireless device may be estimated with an estimation error range. Subsequently, at 443, the location and error range thereof are compared with thresholds to determine whether or not the wireless device qualifies for beamforming. The thresholds may include, for instance, approximate areas of the coverage area of the access node that may benefit from beamforming. If the location meets the thresholds, the wireless device is determined to qualify for beamforming at 444. If the location does not meet the thresholds, the wireless device does not qualify for beamforming at 445. In either case, a decision is output, and other operations may be performed as described in, for instance, FIG. 2 or 5.

Figure 5:
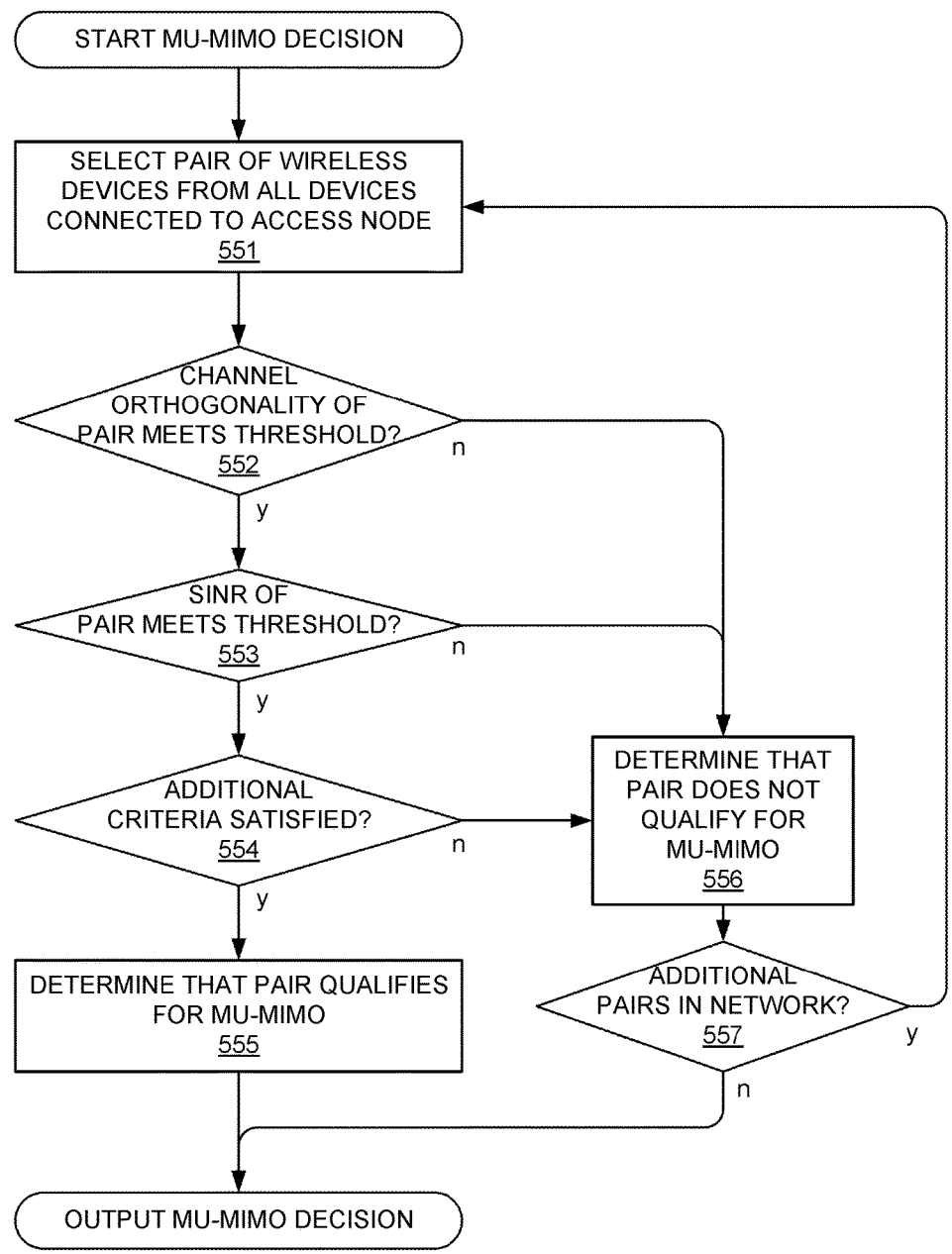
FIG. 5 depicts an exemplary method for determining whether a pair of wireless devices qualifies for MU-MIMO.

FIG. 5 depicts an exemplary method for determining whether a pair of wireless devices qualifies for MU-MIMO. As described herein, in a MU-MIMO transmission mode, data streams can be transmitted to and from different wireless devices using the same resource block or set of resource blocks, thereby increasing overall spectral efficiency in a cell deployed by an access node. Pairing of wireless devices is used to realize the benefit of MU-MIMO, as it determines which wireless devices can share the same resource blocks different transmissions. In exemplary embodiments, the pairing decision may be performed at every subframe, i.e. at every 1ms.

At 551, the method begins with selection of a pair of wireless devices from among the devices connected to an access node. The pair of wireless devices is subject to a first criteria for channel orthogonality compared with a threshold. Only a pair of wireless devices with channel orthogonality above a predefined threshold can be considered for pairing. Thus, if the threshold is not met, at 556 it is determined that the pair does not qualify for MU-MIMO, and additional pairs are determined at 557, if available. If the threshold is met, then a second criteria of the SINR meeting a threshold is evaluated at 553. Only wireless devices with the SINR above a predefined threshold may be considered for pairing. If the threshold is met, then at 554, one or more additional criteria may be evaluated. The one or more additional criteria may include: whether or not there are sufficient resource blocks in the current transmission time interval (TTI) to schedule MU-MIMO, whether or not a threshold throughput gain is achieved after pairing the wireless devices in MU-MIMO mode, whether or not the wireless device uses HARQ retransmission, whether or not one or both wireless devices require a guaranteed bit rate (GBR), such that devices that do not require GBR are prioritized higher, whether or not the wireless devices utilize TTI bundling (these will not be selected as pairs as they typically reside around cell edges), and whether or not they have higher transmission speed capabilities (which are excluded from pairing).

In either case, if all criteria are satisfied, it is determined that the pair of wireless devices qualifies for MU-MIMO at 555, and the decision is output. The method need not check for additional pairs in the network, as only one requirement is sufficient to trigger the method of FIG. 2, as described herein. However, in some exemplary embodiments, a number of pairs may be determined, and threshold numbers of pairs may be exceeded prior to executing the method of FIG. 2, or other operations described herein.

The methods, systems, devices, networks, access nodes, and equipment described above may be implemented with, contain, or be executed by one or more computer systems and/or processing nodes. The methods described above may also be stored on a non-transitory computer readable medium. Many of the elements of communication system 100 may be, comprise, or include computers systems and/or processing nodes. This includes, but is not limited to: access node 110, scheduler 312, controller node 107, and/or network 101.

Figure 6:
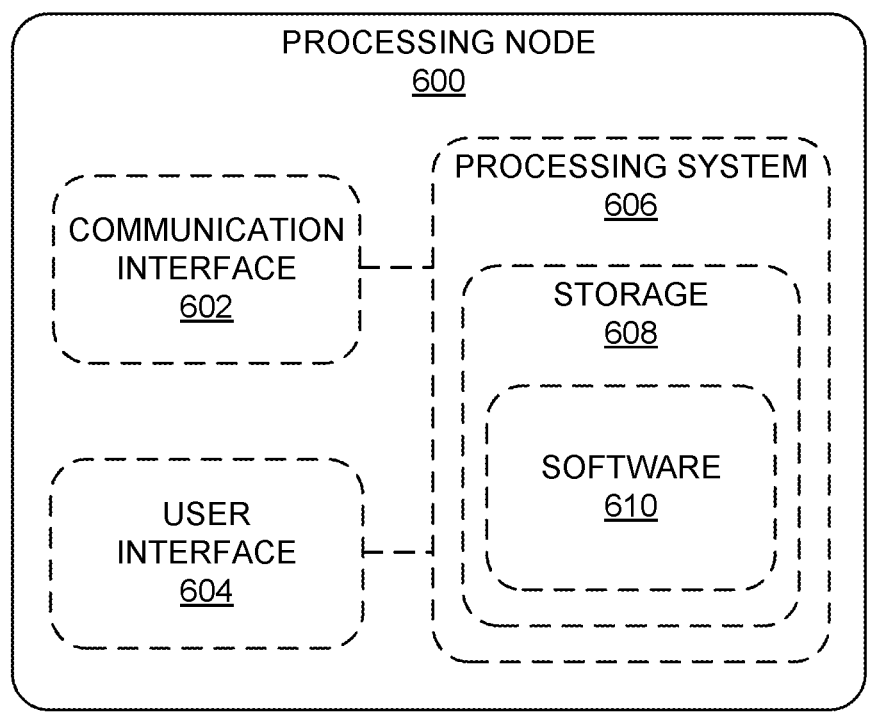
FIG. 6 depicts an exemplary processing node for transmission mode selection.

FIG. 6 depicts an exemplary processing node 600 comprising a communication interface 602, user interface 604, and processing system 606 in communication with communication interface 602 and user interface 604. Processing system 606 includes storage 608, which can comprise a disk drive, flash drive, memory circuitry, or other memory device. Storage 608 can store software 610 which is used in the operation of the processing node 600. Storage 608 may include a disk drive, flash drive, data storage circuitry, or some other memory apparatus. For example, storage 608 may include a buffer. Software 610 may include computer programs, firmware, or some other form of machine-readable instructions, including an operating system, utilities, drivers, network interfaces, applications, or some other type of software. For example, software 610 may include a scheduler module. Processing system 606 may include a microprocessor and other circuitry to retrieve and execute software 610 from storage 608. Processing node 600 may further include other components such as a power management unit, a control interface unit, etc., which are omitted for clarity. Communication interface 602 permits processing node 600 to communicate with other network elements. User interface 604 permits the configuration and control of the operation of processing node 600.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method for transmission mode selection, the method comprising:
   determining that a first wireless device out of a plurality of wireless devices connected to an access node qualifies for a beamforming transmission mode;
   determining that a pair of wireless devices out of the plurality of wireless devices qualifies for a multi-user multiple-input multiple-output (MU-MIMO) transmission mode;
   prioritizing the first wireless device higher than the pair of wireless devices based on one or more of a content type, a device type, or a device capability; and
   selecting the beamforming transmission mode based on the prioritizing.

2. The method of claim 1, wherein the first wireless device is part of the pair of wireless devices.

3. The method of claim 2, further comprising prioritizing the pair of wireless devices based on the one or more of the content type, the device type, or the device capability of a second wireless device in the pair of wireless devices.

4. The method of claim 1, wherein the pair of wireless devices comprises a second wireless device and a third wireless device, the method further comprising:
   prioritizing at least one of the second and third wireless devices higher than the first wireless device; and
   selecting the MU-MIMO transmission mode.

5. The method of claim 1, further comprising:
   determining that the first wireless device and the pair of wireless devices are equally prioritized; and
   selecting the MU-MIMO transmission mode as a default downlink transmission mode.

6. A system for transmission mode selection, the system comprising:
   a processor; and
   a memory coupled to the processor, the memory to store computer-readable instructions that are executed by the processor to perform operations comprising:
   upon a first wireless device qualifying for a beamforming transmission mode and a pair of wireless devices qualifying for a multi-user multiple-input multiple-output (MU-MIMO) transmission mode, determining a first priority for the first wireless device and a second priority for the pair of wireless devices, wherein the first and second priorities are based on one or more of a content type, a device type, or a device capability;
   upon the first priority being higher than the second priority, selecting the beamforming transmission mode; and
   upon the second priority being higher than the first priority, selecting the MU-MIMO transmission mode.

7. The system of claim 6, wherein:
   the pair of wireless devices comprises a second wireless device and a third wireless device;
   determining the second priority further comprises determining a third priority for the second wireless device and a fourth priority for the third wireless device; and
   the second priority is equal to the higher of the third and fourth priorities.

8. The system of claim 6, wherein the operations further comprise determining that the first wireless device qualifies for the beamforming transmission mode based on a sounding reference signal transmitted from the first wireless device.

9. The system of claim 8, wherein the operations further comprise determining one or more of an angle of arrival and a distance based on the sounding reference signal.

10. The system of claim 6, wherein the operations further comprise determining that the pair of wireless devices qualifies for the MU-MIMO transmission mode based on a channel orthogonality of each of the second and third wireless devices meeting a first threshold.

11. The system of claim 10, wherein the operations further comprise determining that the pair of wireless devices qualifies for the MU-MIMO transmission mode based on a signal-to-interference-plus-noise (SINK) of each of the second and third wireless devices meeting a second threshold.

12. A processing node for transmission mode selection, the processing node comprising a processor that enables the processing node to perform operations comprising:
   determining that a first wireless device qualifies for a beamforming transmission mode and a pair of wireless devices qualifies for a multi-user multiple-input multiple-output (MU-MIMO) transmission mode, wherein the pair of wireless devices comprises a second wireless device and a third wireless device;
   determining a priority of one or more of a content type, a device type, or a device capability of each wireless device from among the first, second, and third wireless devices; and
   based on the priority of the first wireless device being higher than the priority of the pair of wireless devices, selecting the beamforming transmission mode.

13. The processing node of claim 12, wherein the content type for each wireless device comprises one of an online game, a video stream, an email, or a web page.

14. The processing node of claim 13, wherein a priority of each of the video stream and the online game is higher than a priority of each of the email and the web page.

15. The processing node of claim 13, wherein the operations further comprise determining the content type based on a deep packet inspection.

16. The processing node of claim 12, wherein the device type for each wireless device comprises one of a preferred device type or a standard device type.

17. The processing node of claim 16, wherein a priority of the preferred device type is higher than a priority of the standard device type.

18. The processing node of claim 12, wherein:
   the device capability for each wireless device comprises a number of accessible bands, and
   a smaller number of accessible bands is prioritized higher than a greater number of accessible bands.

19. The processing node of claim 12, wherein:
the device capability for each wireless device comprises
   a number of carriers that can be aggregated, and
a smaller number of carriers is prioritized higher than a
   greater number of carriers.

\* \* \* \* \*